United States Patent [19]

Chu et al.

[11] Patent Number: 4,696,807
[45] Date of Patent: Sep. 29, 1987

[54] CRYSTALLINE MICROPOROUS OXIDE MCM-21 AND PROCESS FOR ITS PREPARATION

[75] Inventors: Cynthia T-W Chu, Pennington; Clarence D. Chang, Princeton, both of N.J.

[73] Assignee: Mobil Oil Corporation, New York, N.Y.

[21] Appl. No.: 836,933

[22] Filed: Mar. 6, 1986

[51] Int. Cl.$^4$ ............................................. C01B 15/16
[52] U.S. Cl. ................................... 423/305; 502/208; 502/213
[58] Field of Search ................. 423/305; 502/208, 213

[56] References Cited

U.S. PATENT DOCUMENTS

| | | | |
|---|---|---|---|
| 4,527,001 | 7/1985 | Kaiser | 585/643 |
| 4,528,414 | 7/1985 | Long et al. | 585/513 |
| 4,554,143 | 11/1985 | Messina | 502/213 |

Primary Examiner—John Doll
Assistant Examiner—Jackson Leeds
Attorney, Agent, or Firm—Alexander J. McKillop; Michael G. Gilman; Dennis P. Santini

[57] ABSTRACT

This invention relates to a new synthetic crystalline microporous oxide material, a method for its preparation and use thereof in catalytic conversion of organic compounds. The new crystalline material exhibits a distinctive X-ray diffraction pattern.

6 Claims, No Drawings

CRYSTALLINE MICROPOROUS OXIDE MCM-21 AND PROCESS FOR ITS PREPARATION

BACKGROUND OF THE INVENTION

1. Field of the Invention

This invention relates to a novel synthetic porous crystalline material designated as "MCM-21", to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, crystalline microporous oxides having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline porous oxides. These materials can be described as a rigid three-dimensional framework of oxides such as $SiO_4$ and $AlO_4$ in which the tetrahedra are cross-linked by the sharing of oxygen atoms whereby the ratio of the total non-oxygen atoms to oxygen atoms is 1:2. The electrovalence of the tetrahedra may be balanced by the inclusion in the crystal of a cation, for example an alkali metal or an alkaline earth metal cation. One type of cation may be exchanged either entirely or partially with another type of cation utilizing ion exchange techniques in a conventional manner. By means of such cation exchanqe, it has been possible to vary the properties of a given crystalline porous oxide by suitable selection of the cation. The spaces between the tetrahedra are occupied by molecules of water prior to dehydration.

Prior art techniques have resulted in the formation of a qreat variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U. S. Patent 3,314,752), zeolite ZSM-5 (U.S. Pat. No. 3,702,886), zeolite ZSM-11 (U.S. Pat. No. 3,709,979), zeolite ZSM-12 (U. S. Patent 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates have a composition typified as:

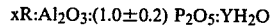

$xR:Al_2O_3:(1.0\pm0.2)P_2O_5:YH_2O$ wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

$AlPO_4 = (AlO_2^-)(PO_2^{3+})$

U.S. Pat. No. 4,440,871 teaches material called silicoaluminophosphate without non-aluminum metal.

The phosphorus-substituted zeolites of Canadian Patent Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

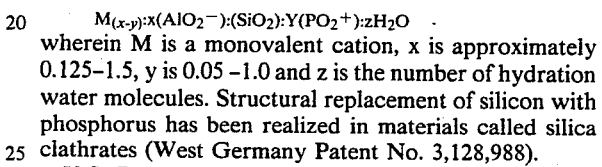

$M_{(x-y)}:x(AlO_2^-):(SiO_2):Y(PO_2^+):zH_2O$ wherein M is a monovalent cation, x is approximately 0.125-1.5, y is 0.05-1.0 and z is the number of hydration water molecules. Structural replacement of silicon with phosphorus has been realized in materials called silica clathrates (West Germany Patent No. 3,128,988).

U.S. Pat. No. 4,363,748 describes a combination of silica and aluminum-calcium-cerium phosphate as a low acid activity catalyst for oxidative dehydrogenation. Great Britain Patent No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to inpart acidity. U.S. Pat. No. 4,228,036 teaches an alumina-aluminum phosphate-silica matrix as an amorphous body to be mixed with zeolite for use as cracking catalyst. U.S. Pat. No. 3, 213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices.

The crystalline material synthesized hereby has a novel structure. It is a molecular sieve exhibiting ion-exchange properties and is easily and conveniently converted to material having intrinsic catalytic activity.

SUMMARY OF THE INVENTION

The present invention is directed to a novel porous crystalline material, designated as "MCM-21", a method for its preparation, and the conversion of organic compounds contacted therewith.

The composition of MCM-21 may be expressed, on an anhydrous basis, as follows:

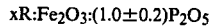

$xR:Fe_2O_3:(1.0\pm0.2)P_2O_5$ wherein R is an organic component resulting from organics present during synthesis of the MCM-21, and x represents the amount of R needed to fill the microporous voids of the MCM-21. The value of x may vary from 0 to about 2, depending upon whether the MCM-21 has been treated to remove the organic component.

The typical X-ray diffraction pattern intensities for MCM-21 are shown in Table 1, hereinafter.

DESCRIPTION OF SPECIFIC EMBODIMENTS

MCM-21 crystals described and claimed herein have a typical X-ray diffraction pattern which distinguishes it from other crystalline materials. The intensities of that pattern are substantially as follows:

TABLE 1

| Interplanar d-Spacing (A) | Relative Intensity, I/Io |
| --- | --- |
| 9.83 ± .2 | vs |
| 6.09 ± .14 | w |
| 5.31 ± .12 | m |
| 4.91 ± .1 | w |
| 4.74 ± .08 | w |
| 4.60 ± .08 | w |
| 4.17 ± .08 | w |
| 4.00 ± .07 | w |
| 3.55 ± .06 | w |
| 3.35 ± .06 | w |
| 3.28 ± .05 | w |
| 3.22 ± .05 | w |
| 3.07 ± .05 | w |
| 3.05 ± .05 | w |
| 2.93 ± .05 | w |
| 2.82 ± .05 | s |
| 2.74 ± .05 | vs |
| 2.65 ± .04 | m |
| 2.57 ± .04 | w |
| 2.48 ± .04 | w |
| 2.45 ± .04 | w |
| 2.36 ± .04 | w |
| 2.34 ± .04 | w |
| 2.29 ± .04 | w |
| 2.12 ± .04 | w |
| 2.09 ± .04 | w |
| 2.03 ± .04 | w |
| 1.96 ± .04 | w |
| 1.94 ± .04 | w |
| 1.92 ± .04 | w |
| 1.91 ± .04 | w |
| 1.87 ± .04 | w |
| 1.82 ± .04 | w |
| 1.75 ± .04 | w |
| 1.72 ± .04 | w |
| 1.71 ± .04 | w |
| 1.70 ± .04 | w |
| 1.64 ± .03 | m |
| 1.61 ± .03 | w |
| 1.58 ± .03 | w |
| 1.55 ± .03 | w |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Taole 1, the relative intensities are given in terms of the symbols w=weak, m=medium, s=strong and vs=very strong. In terms of intensities, these may be generally designated as follows:

w=0–20
m=20–40
s=40–60
vs=60–100

It should be understood that this X-ray diffraction pattern is characteristic of all the species of MCM-21 compositions. Various cationic forms reveal substantially the same pattern with some minor shifts in interplanar spacing and variation in relative intensity. Other minor variations can occur, depending on the iron to phosphorus ratio If the particular sample, as well as its degree of thermal treatment.

The above X-ray diffraction pattern distinguishes MCM-21 from the molecular sieves disclosed in U.S. Pat. Nos. 4,527,001 and 4,528,414.

The crystalline microporous oxide MCM-21 can be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be impregnated therein or intimately physically admixed therewith. Such component can be impregnated in or on to it such as for example, by, in the case of platinum, treating the MCM-21 with a solution containing a platinum metal-containing ion. Thus, suitable platinum compounds include chloroplatinic acid, platinous chloride and various compounds containing the platinum amine complex.

MCM-21 can be thermally treated over a wide range of temperatures. This thermal treatment is generally performed by heating the MCM-21 at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

The new MCM-21, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing MCM-21 in a vacuum, but a longer time is required to obtain a sufficient amount of dehydration.

MCM-21 can be prepared from a reaction mixture containing sources of alkali or alkaline earth metal cations (M), an oxide of iron, orthophosphoric acid, organic component (R) selected from the group consisting of compounds of tetramethylammonium, tetrapropylammonium, ethylenediamine, quinuclidine and mixtures thereof, and water, said reaction mixture having a composition, in terms of mole ratios of oxides, within the following ranges:

| Reactants | Useful | Preferred |
| --- | --- | --- |
| $M_{2/p}O/R$ | ≦10 | 0.5 to 5 |
| $R/P_2O_5$ | 0.01 to 3 | 0.1 to 2 |
| $Fe_2O_3/P_2O_5$ | 0.5 to 5 | 0.5 to 1 | wherein p is the valence of M.

Crystallization of the new MCM-21 can be carried out at either static or stirred condition in a suitable reactor vessel, such as for example, polypropylene jars or teflon lined or stainless steel autoclaves. The total useful range of temperatures for crystallization is from about 50° C. to about 300° C. for a time sufficient for crystallization to occur at the temperature used, e.g. from about 24 hours to about 7 days. Autogeneous pressure is preferred at these temperatures. Thereafter, the crystals are separated from the liquid and recovered.

The reaction mixture can be prepared utilizing materials which supply the appropriate components. Such materials may include nitrates and sulfates, and the salt of the organic R as directing agent.

The organic R salt may be, for example, a halide (e.g. iodide, chloride or bromide), nitrate, hydroxide, sulfate, bisulfate, perchlorate, etc.

It should be realized that the reaction mixture oxides can be supplied by more than one source. The reaction mixture can be prepared either batchwise or continuously. Crystal size and crystallization time of the new crystalline material will vary with the nature of the reaction mixture employed and the crystallization conditions.

In all cases, synthesis of the MCM-21 crystals is facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In general, organic compounds such as, for example, those selected from the group consisting of hydrocarbons, alcohols and ethers, are converted to conversion products such as, for example, aromatics and lower molecular weight hydrocarbons, over catalyst comprising the crystalline microporous oxide MCM-21 hereof by contact under organic compound conversion conditions including a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20 hr$^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20 hr$^{-1}$; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 hr$^{-1}$ and a hydrogen/hydrocarbon mole ratio of from about 0 (no added hydrogen) to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 hr$^{-1}$ and a hydrogen/hydrocarbon mole ratio of from about 0 (no added hydrogen) to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100 hr$^{-1}$; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 hr$^{-1}$ and a hydrogen/hydrocarbon mole ratio of from about 0 (no added hydrogen) to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20 hr$^{-1}$; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 hr$^{-1}$ and an aromatic hydrocarbon/alkylating agent mole ratio of from about 1/1 to about 20/1; and transalkylating aromatic hydrocarbons in tne presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 hr$^{-1}$ and an aromatic hydrocarbon/polyalkylaromatic hydrocarbon mole ratio of from about 1/1 to about 16/1.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new MCM-21 crystal, i.e. combined therewith, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the MCM-21 crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

Orthophosphoric acid (85%, 23g) diluted with 50g of water was mixed with ferric nitrate (40.4g). Tetrapropylammonium hydroxide (25%, 88.4g) was added to the mixture. After vigorous stirring, 31 cc of 10 N sodium hydroxide solution was added. The reaction mixture was sealed in a stainless steel autoclave and heated with stirring at 150° C. After 6 days, the product was filtered, washed, dried and analyzed by X-ray diffraction.

The diffraction pattern of the dried product crystals of this example is presented in Table 2.

TABLE 2

| Interplanar d-spacing (A) | Observed 2 Theta | Relative Intensity |
|---|---|---|
| 9.83 | 8.99 | 100.00 |
| 6.09 | 14.54 | 14.87 |
| 5.31 | 16.71 | 22.51 |
| 4.91 | 18.07 | 9.86 |
| 4.74 | 18.73 | 10.51 |
| 4.60 | 19.28 | 18.20 |
| 4.17 | 21.30 | 3.65 |
| 4.00 | 22.24 | 1.68 |
| 3.55 | 25.06 | 5.23 |
| 3.35 | 26.61 | 16.77 |
| 3.28 | 27.23 | 2.91 |
| 3.22 | 27.72 | 14.61 |
| 3.07 | 29.12 | 8.02 |
| 3.05 | 29.33 | 12.84 |
| 2.93 | 30.49 | 9.65 |
| 2.82 | 31.67 | 55.36 |
| 2.74 | 32.63 | 73.39 |
| 2.65 | 33.86 | 25.51 |
| 2.57 | 34.86 | 5.55 |
| 2.48 | 36.19 | 3.52 |
| 2.45 | 36.65 | 2.26 |
| 2.36 | 38.05 | 3.40 |
| 2.34 | 38.54 | 10.51 |
| 2.29 | 39.38 | 15.95 |
| 2.12 | 42.62 | 7.64 |
| 2.09 | 43.28 | 4.48 |
| 2.03 | 44.64 | 13.84 |

TABLE 2-continued

| Interplanar d-spacing (A) | Observed 2 Theta | Relative Intensity |
|---|---|---|
| 1.96 | 46.20 | 4.33 |
| 1.94 | 46.74 | 4.62 |
| 1.92 | 47.21 | 4.77 |
| 1.91 | 47.73 | 11.19 |
| 1.87 | 48.62 | 10.74 |
| 1.82 | 50.19 | 9.23 |
| 1.75 | 52.18 | 12.60 |
| 1.72 | 53.11 | 6.04 |
| 1.71 | 53.46 | 8.42 |
| 1.70 | 53.99 | 4.05 |
| 1.64 | 56.19 | 20.30 |
| 1.61 | 57.35 | 3.40 |
| 1.58 | 58.51 | 5.39 |
| 1.55 | 59.70 | 3.65 |

After air calcination of the product crystals of this example at 538° C. for 3 hours, they proved to have the chemical composition, in terms of mole ratios of oxides, $Fe_2O_3:(1.0\pm0.2)\ P_2O_5$.

EXAMPLES 2-4

Example 1 was repeated, except with different organic (R) directing agents and at various reaction temperatures as indicated in Table 3, below. In each instance, the solid crystalline product showed characteristic phase with X-ray powder diffraction pattern essentially the same as that of MCM-21 of Example 1.

TABLE 3

| Example | R | Reaction Time (Days) | Reaction Temp. (°C.) |
|---|---|---|---|
| 2 | tetramethylammonium hydroxide | 5 | 200 |
| 3 | ethylenediamine | 5 | 200 |
| 4 | quinuclidine | 6 | 150 |

EXAMPLE 5

Orthophosphoric acid (85%, 23g) diluted with 50g of water was mixed with 41.8 g $Fe_2(SO_4)_3$. Tetrapropylammonium hydroxide (25%, 884. g) was added to the mixture. After vigorous stirring, 45cc of 1N NaOH and 35cc 10N NaOH was added. The reaction mixture was sealed in a stainless steel autoclave and heated witn stirring at 150° C. After 4 days the crystalline product was filtered, washed, dried and calcined. The X-ray diffraction pattern of the product crystals showed characteristic phase same as MCM-21 in Example 1.

What is claimed is:

1. A synthetic crystalline microporous oxide material having a composition, on an anhydrous basis, expressed by the formula:

$$xR:Fe_2O_3:(1.0\pm0.2)P_2O_5$$

wherein R is an organic component resulting from organics present during synthesis of said crystalline material selected from the group consisting of compounds of tetramethylammonium, ethylenediamine, and quinuclidine, and x is from 0 to about 2; and being characterized by an X-ray diffraction pattern exhibiting values as set forth in TABLE 1 of the specification.

2. The material resulting from thermal treatment of the crystalline material of claim 1 at a temperature of from about 370° C. to about 925° C. for from about 1 minute to about 20 hours.

3. A method for preparing a synthetic crystalline microporous oxide material having a composition, on an anhydrous basis, expressed by the formula:

$$xR:Fe_2O_3:(1.0\pm0.2)P_2O_5$$

wherein R is an organic component resulting from organics present during synthesis of said crystalline material and x is from 0 to about 2, and being characterized by an X-ray diffraction pattern exhibiting values as set forth in TABLE 1 of the specification, said method comprising preparing a reaction mixture capable of forming said material upon crystallization, said reaction mixture containing sufficient amounts of alkali metal or alkaline earth metal cations, an oxide of iron, water, orthophosphoric acid and organic component selected from the group consisting of compounds of tetramethylammonium, tetrapropylammonium, ethylenediamine, and quinuclidine, said reaction mixture having a composition in terms of mole ratios within the following ranges:

| | |
|---|---|
| $M_{2/p}O:R$ | $\leq 10$ |
| $R:P_2O_5$ | 0.01 to 3 |
| $Fe_2O_3:P_2O_5$ | 0.5 to 5 | wherein M is said alkali metal or alkaline earth metal cation, R is said organic component and p is the valence of M, and maintaining said reaction mixture under crystallization conditions including a temperature of from anout 50° C. to about 300° C. until crystals of said material are formed.

4. The method of claim 3 wherein said reaction mixture has a composition in terms of mole ratios within the following ranges:

| | |
|---|---|
| $M_{2/p}O:R$ | 0.5 to 5 |
| $R:P_2O_5$ | 0.1 to 2 |
| $Fe_2O_3:P_2O_5$ | 0.5 to 1 |

5. The method of claim 3 wherein said reaction mixture further comprises at least about 0.01 weight percent of crystal formation enhancing seed crystals of crystalline product.

6. The method of claim 5 wherein said reaction mixture further comprises at least about 0.01 weight percent of crystal formation enhancing seed crystals of crystalline product.

* * * * *

UNITED STATES PATENT AND TRADEMARK OFFICE
CERTIFICATE OF CORRECTION

PATENT NO. : 4,696,807

DATED : September 29, 1987

INVENTOR(S) : Cynthia T-W. Chu et al

It is certified that error appears in the above-identified patent and that said Letters Patent is hereby corrected as shown below:

Column 1, line 40 "exchanqe" should be --exchange--
Column 1, line 46 "qreat" should be --great--
Column 1, line 65 "Y" should be --y--
Column 2, line 9 "$(PO_2{}^{30})$" should be --$(PO_2{}^+)$--
Column 2, line 20 ":$Y(PO_2{}^+)$" should be --:$y(PO_2{}^+)$--
Column 3, line 61 "Taole" should be --Table--
Column 4, line 7 "lf" should be --of--
Column 8, line 45 "witn" should be --with--

Signed and Sealed this

Twenty-ninth Day of March, 1988

*Attest:*

DONALD J. QUIGG

*Attesting Officer*  *Commissioner of Patents and Trademarks*